| United States Patent [19] | [11] | 4,124,573 |
|---|---|---|
| Watabe et al. | [45] | Nov. 7, 1978 |

[54] SOFT POLYURETHANE ELASTOMER CONTAINING ISOCYANURATE RING

[75] Inventors: Yoji Watabe; Michio Ishii, both of Kodaira; Hiroshi Kaneda; Fumitaka Ino, both of Murayama; Masao Kuwano, Kurume; Yasuyuki Ura, Hino; Shiro Anzai, Murayama, all of Japan

[73] Assignee: Bridgestone Tire Co., Ltd., Tokyo, Japan

[21] Appl. No.: 763,900

[22] Filed: Jan. 31, 1977

[51] Int. Cl.$^2$ .............................................. C08G 18/18
[52] U.S. Cl. ........................................ 528/53; 528/54; 528/58; 528/76; 528/404
[58] Field of Search ............... 260/77.5 NC, 77.5 AB, 260/77.5 AC, 77.5 AP

[56] References Cited

U.S. PATENT DOCUMENTS

| 3,154,522 | 10/1964 | Beitchman | 260/77.5 NC |
| 3,396,167 | 8/1968 | Davies | 260/77.5 NC |
| 3,605,848 | 9/1971 | Lombardi et al. | 260/2.5 AM |
| 3,866,652 | 2/1975 | Ahmad | 260/2.5 AK |
| 3,891,579 | 6/1975 | Cenker et al. | 260/77.5 NC |
| 3,892,685 | 7/1975 | Pusey | 260/77.5 NC |
| 3,943,075 | 3/1976 | Fishbein et al. | 260/77.5 NC |

*Primary Examiner*—M. J. Welsh
*Attorney, Agent, or Firm*—Brooks, Haidt, Haffner & Delahunty

[57] ABSTRACT

A soft polyurethane elastomer containing isocyanurate ring prepared by reacting polyoxypropylene polyol having an OH equivalent molecular weight of about 500–3,000, and a functionality of about 2–5, and polyisocyanate compound in the presence of tertiary amine catalyst, and if desired further combined with organic tin catalyst. This process is advantageous in facilitation of material control during curing reaction, low exothermicity and high thermal stability of the resulting polymer. Further the properties of the polymer are improved by using ethyleneoxide addition polyoxypropylene polyol instead of the above polymer and a specific tertiary amine as a catalyst. The elastomer thus prepared is significantly suitable for tire filling material.

23 Claims, No Drawings

SOFT POLYURETHANE ELASTOMER CONTAINING ISOCYANURATE RING

BACKGROUND OF THE INVENTION

This invention relates to a process for preparing a soft polyurethane elastomer containing isocyanurate ring, having high resilience and thermal stability, which is useful for a tire filling material.

A "soft elastomer" as used herein means an elastomer having JIS hardness ranging about 10°–60°, which is frequently useful for material used under dynamic and high-load conditions, and therefore needs low exothermicity and high resistance to heat (thermal stability). The typical commercially available soft polyurethane elastomer comprises polyoxypropylenepolyol. The prior art soft polyurethane elastomer uses only urethanation curing, and needs a strict control of the equivalent ratio (hereinafter referred to as "ratio NCO/OH") of isocyanate radicals to hydroxy radicals, within about 0.95–1.05 because of entire urethane composition. When the curing reaction incorporates isocyanuration (trimerization by isocyanate radicals), the control of the composition would be facilitated. However, this attempt has not been applied in practice because a soft polyurethane elastomer containing isocyanurate ring has lower thermal stability than that of the entire urethane type soft polyurethane elastomer. It has been believed that the reason for lower stability of the isocyanurate ring-containing elastomer is that tertiary amine which is generally used as catalyst for isocyanuration acts to dissociate thermally the urethane bonding.

SUMMARY OF THE INVENTION

It is the object of this invention to provide a process for preparing a soft polyurethane elastomer containing isocyanurate ring, which has low exothermicity and high thermal stability.

It is another object of this invention to provide a process for preparing a soft polyurethane elastomer containing isocyanurate ring, which facilitates the control of the ratio NCO/OH in the curing reaction.

It is further object of this invention to provide a process for preparing a soft polyurethane elastomer, which prevents a localized micro-gelation.

It is further object of this invention to provide a soft polyurethane elastomer more suitable for tire filling material.

This invention is connected with a process of preparing a soft polyurethane elastomer containing isocyanurate ring, which comprises mixing (a) polyoxypropylene polyol having an OH equivalent molecular weight of about 500–3,000 and a functionality of about 2–5;

(b) polyisocyanate compound in an amount such that the ratio NCO/OH of isocyanate radical equivalent in the compound (b) to hydroxy radical equivalent in the (a) compound is about 0.95–3.3; and (c) tertiary amine catalyst in about 0.01–2.0 weight parts per 100 weight parts of the sum of (a) and (b), and curing the mixture.

Further, this invention is concerned with a process of preparing a soft polyurethane elastomer containing isocyanurate ring, characterized by further adding an organic tin catalyst in an amount of about 0.5 weight parts per 100 weight parts of the sum of (a) and (b) to the above mentioned mixture. In addition, this invention may use polyoxypropylene polyol containing about 5–30 weight percent of ethyleneoxide, and a specific tertiary amine as a catalyst.

DESCRIPTION OF THE PREFERRED EMBODIMENT

The polyols usable in this invention have an OH equivalent molecular weight of about 500–3,000 and a functionality of about 2–5. An OH equivalent molecular weight less than 500 gives rise to an increase of the required polyisocyanate amount, so that the exothermic heat will be increased inconveniently. An OH equivalent molecular weight more than about 3,000 leads to inconvenient reduction of rigidity of the elastomer. A functionality less than 2 leads to difficulty in curing while a functionality more than 5 gives rise to an increase of viscosity after prepolymerization, and unnecessary increase of rigidity of the resulting elastomer. In case of application under dynamic condition, for such tire filling material, the resilience should be as great as possible, and the thermal stability should be as high as possible. From this point of view, the functionality is preferably about 3 or 4, and the OH equivalent molecular weight is about 800–2,500, and more preferably about 800–2,000. In particular, when the OH equivalent molecular weight is greater, for example, about 2,000–3,000, the preferred functionality is about 3 or 4 for easily net working.

When the ethyleneoxide addition polyoxypropylene polyol is used for this invention instead of the ordinary polyol, the thermal stability of the resulting polyurethane elastomer will be increased. The amount of added ethyleneoxide may be about 5–30 weight percent. When the additional amount is less than 5 percent, the effect is insignificant. An amount more than 30 percent will lead to inconvenience in operation because the resulting polyol will solidify at room temperature. Further the addition of ethyleneoxide at the terminals will increase the reactivity. The addition of ethyleneoxide is significant particularly when the OH equivalent molecular weight is great, for example, about 2,000–3,000, which is apt to reduce the reactivity. The polyol of this invention may be used alone or in a combination of two or more polyols.

Polyisocyanate compounds which may be used in this invention include aliphatic polyisocyanates such as tetramethylene-1,4-diisocyanate, hexamethylene-1,6-diisocyanate, 1,3- and 1,4-xylenediisocyanate; alicyclic polyisocyanates such as ω,ω'-diisocyanate-1,2-dimethylcyclohexane, 1-methyl cyclohexane-2,4- and 2,6-diisocyanate, 1,3- and 1,4-cyclohexyl diisocyanate, methylene bis(4-cyclohexyl isocyanate), isophorone diisocyanate; 2,4- and 2,6-tolylene diisocyanate, 5-chloro-2,4-tolylene diisocyanate, diphenyl-4,4'-diisocyanate, meta and para-phenylene diisocyanate, 1,4-, 1,5-, 2,6- and 2,7-naphthalene diisocyanate, diphenylmethane-4,4'-diisocyanate, diphenyl dimethylmethane-4,4'-diisocyanate, diphenylether-4,4'-diisocyanate, 3,3'-dimethyl diphenyl-4,4'-diisocyanate and a polymethylene polyphenyl polyisocyanate having the following formula

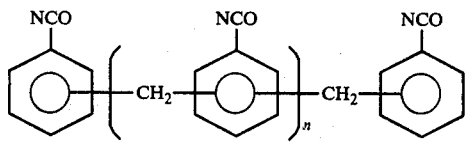

wherein $n = 0-5$.

In the whole consideration of availability, cost, mutual solubility with the polyol, and low exothermicity, 2,4- and 2,6-tolylene diisocyanates are preferred.

The suitable amount of polyisocyanate compound in this invention depends upon the combination with the polyol, such that the ratio NCO/OH ranges about 0.95 to 3.30, preferably about 1.00-2.00. The ratio NCO/OH less than 0.95 results in an increase of exothermicity of the prepared soft elastomer. The ratio above 3.30 results in an unnecessary increase of rigidity of the product.

In comparison of this invention with the entire urethane type of soft polyurethane elastomer, the hardness of the product in accordance with this invention can be readily controlled by changing the ratio NCO/OH (the hardness will increase with an increase of NCO/OH), while the prior art soft elastomer is limitative because the ratio NCO/OH must be limited to about 0.95 to 1.05 for suitable application, and the hardness must be controlled only by troublesome control of OH equivalent molecular weight of the polyol.

The tertiary amine catalysts usable in this invention include 2,4,6-trisdimethylaminomethylphenol, N,N-dimethyl benzylamine, N,N-dimethyl cyclohexylamine, triethylenediamine, tri-n-butylamine and 1,8-diaza-bichloro[5,4,0]-undecene-7. These tertiary amines can accelerate both urethanation of OH and NCO radicals and trimerization of NCO radicals, that is, two reactions in isocyanuration. The reason why the mixture is cured even at the ratio NCO/OH above 1.00 is that excess isocyanate radicals will cause isocyanuration to form net working in the soft elastomer.

Among the above-mentioned tertiary amine catalysts, 2,4,6-tris dimethylamino methylphenol, N,N-dimethylbenzylamine, N,N-dimethylcyclohexylamine, triethylenediamine and tri-n-butylamine are preferred for high thermal stability required in a soft elastomer.

Alternatively, the tertiary amine of this invention may used in the form of quarternary ammonium salt with phenol, 2-ethylhexanoic acid or oleic acid.

The preferable amount of the tertiary amine is 0.01 to 2.0 parts by weight on the basis of 100 parts by weight of the sum of the polyol and the tolylene diisocyanate, and is preferably 0.1 to 1.0 part by weight. An amount below 0.01 part results in some difficulty in curing reaction, and an amount more than 2.0 parts results in difficult control of the reaction.

In addition to the tertiary amine catalyst, organic tin catalyst may be used in this invention. The typical organic tin catalysts for this invention include di-n-butyl tin dilaurate, stannous octoate, trimethyl tin hydroxide, and dimethyl ditinchloride. These catalysts accelerate urethanation and may be used in the amount of not more than 0.5 weight parts per 100 weight parts of the polyol and the isocyanate. The organic tin catalyst is not always used, but it can provide high resilience to the resulting elastomer.

The practice of mixing the above mentioned materials for production of the soft elastomer may be carried out by one shot method or prepolymer method as follows.

In the one shot method the predetermined amounts of the polyol, polyisocyanate and the catalyst are simultaneously mixed. If possible, it is better that the catalyst be premixed homogenously with the polyol. The reason for this is to avoid the occurrence of localized microgelation which is frequently observed when all of the components are simultaneously mixed. The mixture may be poured into the mould or tire and cured at a temperature ranging preferably from room temperature 20° C. to about 130° C.

In the prepolymer method, polyol and polyisocyanate are reacted at the first stage, to form a prepolymer terminated with isocyanate group. The reaction is carried out in an inert gas such as dried nitrogen so as to avoid contacting with moisture. The preferable temperature is 20° C.-100° C. The reaction period is usually 1-6 hours. The equivalent ratio of isocyanate radicals in the prepolymer and active hydroxy radicals in the polyol should be 1.5-15. This equivalent ratio can be defined by determining the mixing ratio of the prepolymer and the additional polyol. When it is desired to increase the ratio of the polyol to the prepolymer, the equivalent ratio NCO/OH must be high. However, the total equivalent ratio NCO/OH of isocyanate radicals to the sum of active hydroxy radicals in the prepolymer and active hydroxy radicals in the additional polyol must be 0.95-3.30 as previously described. The additional polyol to be mixed with the prepolymer may be same as the polyol used for the prepolymerization, or may be other different polyol. While the tertiary amine should be added to the polyol, the organic tin catalyst may be added either to the prepolymer or to the polyol prior to mixing for curing. The curing of the mixture can be carried out in the similar procedure to in one shot method.

The soft elastomer prepared in accordance with this invention possesses appropriate softness, and high thermal stability. It may be used as various kinds of tire filling material for preventing puncture; filling material for rubber vibration isolator; and other material for such product as requiring low exothermicity under dynamic conditions. Further the soft elastomer of this invention may be used as core material for golf balls. When the soft elastomer is practically applied for filling material, it can be cured either by one shot method or by prepolymer method. The tire filled with the elastomer of this invention has low exothermicity and high thermal stability, compared with the tire filled with the conventional commercial available filling material. Thus, no special abnormality was recognized even after long operation.

This invention further will be illustrated by Examples and comparison examples, but should not be considered as restricted thereto. The items used to evaluate the elastomers include JIS hardness, resilience, and thermal stability. Resilience is measured by Dunlop-Resilience Tester and calculated by using the following equation.

$$\text{Resilience } (\%) = \frac{1 - \cos \theta}{1 - \cos 40°} \times 100$$

$\theta$: bouncing angle. The thermal stability is determined by using the samples of $2 \times 2 \times 2$ mm which are subjected to a thermal mechanical analyser (produced by Shimazu Seisakusho), with load of 5kg/cm$^2$ through pin of 0.9 mm diameter, heating at a rate of 5° C. per minute in nitrogen atmosphere, wherein the thermal elongation curve is measured and the peak temperature of the curve is referred to as thermal stability.

The parts in the Examples are by weight.

EXAMPLE 1

To 100 parts of polyoxypropylene triol with an OH equivalent molecular weight of 1210, were added 0.34 parts of 2,4,6-tris(dimethylaminomethyl) phenol (referred to as DMP hereinafter) and 0.011 parts of stannous octoate and stirred to form the uniform mixture. To 100 parts of this mixture were added predetermined amounts as shown in Table 1 of tolylenediisocyanate having isomer fraction of 2,4- and 2,6- isomers of 80/20 by weight, and sufficiently stirred at room temperature. (The method as described above, wherein the components were mixed in one step is referred to as one shot method hereinafter). The resulting mixture was poured into the mould 4 mm thick and cured at 70° C. for 22 hours. After the moulding was removed from the mould, it was kept in a desiccator for one week for aging. The resulting mouldings were tested for determining the hardness, resilience of the samples. The results are shown in Table 1.

As shown in Table 1, it was found that the resilience is maintained at high level over a wide range of the equivalent ratio NCO/OH. Further, it was found that the hardness of the mouldings can be readily controlled by changing the ratio of the polyol and the polyisocyanate.

When the equivalent ratio NCO/OH exceeds about 2.0, the hardness of the mouldings is more than the appropriate hardness of 60° and further the resilience is apt to decrease. Therefore, the equivalent ratio NCO/OH is preferably less than about 2.0. On the other hand, the equivalent ratio below about 0.95 results in drop of resilience. The sample 1-C only was measured with respect to the thermal stability and found to be satisfactory.

The tire internal filling material mixture was prepared in accordance with the same procedure as the sample 1-C, and was introduced by pressure into tire (LT 7.50-16, 14PR) through the valve hole, followed by curing under the same condition as that of Example 1. For comparison, the same procedure was followed by using a commercially available urethan filling material (produced by Synair Corporation; trade name "Tyr-Fil"). The tires filled in accordance with the above procedure were tested with a load of 1510 Kg, at a speed of 60 Km/hour at 38° C., rotating on a smooth drum of 1.7 m diameter. While the commercially available filling material reached its melting point after about 3 hours test, the filling material of this invention was found without any abnormality after 10 hours operation, which indicates the excellent properties of the novel filling material. Further, it was observed that the rate of temperature raise of the commercially available filling material driven on the drum was higher by about 4° C./hour than that of the inventive filling material thus produced.

EXAMPLE 2

The procedure of Example 1 was repeated using 100 parts of polyoxypropylene polyethylene oxide triol copolymer containing ethyleneoxide in an amount of 10 weight percent, and having the OH equivalent molecular weight of 1,100; or 100 parts of polyoxypropylene polyethylene oxide tetraol containing ethyleneoxide in an amount of 10 weight percent, having the OH equivalent molecular weight of 1,510; 0.33 parts of DMP and 0.011 parts of stannous octoate, to form the samples which were tested for hardness, resilience, thermal stability. The results are shown in Table 1. Table 1 shows that in comparison of the sample 2-a with 1-c and 2-b, the addition of ethyleneoxide, and increase of the functionality will improve the thermal stability.

Table 1

| Sample No. | Functionality | Contents of ethylene oxide(%) | Tolylene diisocyanate | Equivalent ratio of NCO/OH | JIS hardness (°) | Resilience (%) | Thermal stability (° C) |
|---|---|---|---|---|---|---|---|
| 1-a | 3 | 0 | 18.0 | 2.50 | 64 | 81.1 | — |
| 1-b | 3 | 0 | 14.4 | 2.00 | 56 | 87.4 | — |
| -c  | 3 | 0 | 11.1 | 1.54 | 50 | 91.5 | 180 |
| -d  | 3 | 0 | 7.7  | 1.08 | 44 | 92.9 | — |
| -e  | 3 | 0 | 6.9  | 0.95 | 38 | 89.2 | — |
| -f  | 3 | 0 | 6.0  | 0.83 | 21 | 74.6 | — |
| 2-a | 3 | 10 | 10.6 | 1.34 | 53 | 94.3 | 185 |
| -b  | 4 | 10 | 8.2  | 1.43 | 54 | 93.5 | 193 |
| -c  | 4 | 10 | 6.3  | 1.11 | 45 | 93.5 | 186 |

EXAMPLE 3

The procedure of Example 1 was repeated using 100 parts of polyoxypropyleneoxide triol copolymer containing ethyleneoxide at the terminals in an amount of 10 weight percent, and having the OH equivalent molecular weight of 1,100; 10.6 parts of TDI 80, 0.33 parts of the tertiary amines as shown in Table 2 and 0.011 parts of stannous octoate. The hardness, resilience, thermal stability were measured. The results are shown in Table 2.

Table 2 indicates that the samples using DMP, N,N-dimethylbenzylamine, N,N-dimethylcyclohexylamine, triethylenediamine, tri-n-butylamine evidence appropriate hardness, high resilience and high thermal stability, which characteristics are suitably balanced. On the other hand, the samples using DBU phenolates, 2-ethylhexanoate, and oleate of DBU evidence appropriate hardness and high resilience, but thermal stability lower than that of the fine former samples.

Table 2

| Sample No. | Tertiary amine | JIS Hardness (°) | Resilience (%) | Thermal Stability (C) |
|---|---|---|---|---|
| 3-a | DMP | 58 | 94.3 | 185 |
| -b | N,N-dimethylbenzylamine | 50 | 94.3 | 188 |
| -c | N,N-dimethylcyclohexylamine | 49 | 95.7 | 190 |
| -d | triethylenediamine | 54 | 94.3 | 194 |
| -e | tri-n-butylamine | 48 | 92.0 | 185 |
| -f | DBU*[1] | 54 | 95.3 | 124 |
| -g | DBU . phenolic salt | 53 | 94.3 | 135 |
| -h | DBU . ethylhexanoate | 54 | 92.3 | 138 |
| -i | DBU.oleate | 54 | 95.7 | 150 |

*[1]DBU: 1,8-diaza-bicyclo[5, 4, 0]undecene-7.

EXAMPLE 4

100 Parts of polyoxypropylene triol having the OH equivalent molecular weight of 1,210 were dehydrated at 90° C. under the reduced pressure of less than 4 mm Hg for 3 hours, and cooled to 80° C. To this, were added 14.42 parts of tolylene diisocyanate with 2,4- and 2,6-isomer fraction of about 80/20 which corresponded to the equivalent ratio NCO/OH of 2.0, and the reaction continued for five hours. The resulting prepolymer had the NCO content of 3.18 percent, 100 parts of the resulting prepolymer and 44.5 parts of the above-mentioned triol containing 0.416 parts of DMP dissolved were mixed and stirred homogeneously at room temperature. The mixture was poured in the mould 4 mm thick and cured at 70° C. for 22 hours. Separately, 100 parts of the same prepolymer and 44.5 parts of the triol containing 0.416 parts of DMP and 0.017 parts of stannous octoate were mixed and cured in the same manner. The two cured mouldings were removed from the mould and kept at room temperature in a desiccator containing silica gel for one week. The resulting samples were tested for hardness and resilience. The result is shown in Table 3.

As shown in Table 3, without addition of stannous octoate the excellent results can be obtained, and further the stannous octoate can improve the resilience.

stability can be obtained because the mixing ratio of the prepolymer and the additional polyol was such as 25:75, and 50:50.

Table 4

| Sample No. | NCO/OH in preparation of the prepolymer | Prepolymer | Additional tetraol | Total NCO/OH (equivalent ratio) | JIS hardness (°) | Resilience (%) | Thermal stability (° C) |
|---|---|---|---|---|---|---|---|
| 5-a | 7.1 | 25 | 75 | 1.35 | 53 | 93.4 | 198 |
| 5-b | 2.9 | 50 | 50 | 1.33 | 53 | 95.3 | 190 |

EXAMPLE 6

100 Parts of polyoxypropylenetriol having the OH equivalent molecular weight of 1,400 were dried at 90° C. under the reduced pressure of less than 4 mm Hg for three hours, and cooled to 80° C. To this, were added 12.6 parts of TDI 80 which corresponds to NCO/OH of 2.00 and reacted under nitrogen atmosphere for five hours. The resulting prepolymer contains NCO of 2.6 percent. After 0.2 parts of phenolate of DBU was added to 100 parts of the prepolymer and stirred, the mixture was poured by pressure into tire (size LT 6.00–16) which was tested in driving. No special abnormality was recognized.

Polyoxypropyleneglycol having the OH equivalent molecular weight of 886 was dehydrated to form liquid Table 3

| Sample No. | Amount of additional triol for dissolving catalyst | Amount of catalyst per 100 parts of the prepolymer and the additional triol | | (Equivalent ratio) Total NCO/OH | Properties | |
|---|---|---|---|---|---|---|
| | | DMP | Stannous octoate | | Hardness Hd (JIS°) | Resilience (%) |
| 4-a | 44.5 | 0.288 | 0 | 1.33 | 50 | 90.6 |
| -b | 44.5 | 0.288 | 0.012 | 1.33 | 52 | 94.8 |

EXAMPLE 5

100 Parts of polyoxypropylene polyethyleneoxide tetraol copolymer containing the terminatedly addition-polymerized ethyleneoxide in an amount of 10 percent by weight, and having the OH equivalent molecular weight of 1,510 were dehydrated at 90° C. under the reduced pressure of less than 4 mm Hg for three hours. Then the polymer was cooled to 80° C. and to this was added 40.9 parts of TDI 80 (NCO/OH = 7.1) and reacted under nitrogen atmosphere for five hours. The resulting polymer had the NCO content of 11.6 percent, 25 parts of the prepolymer, and 75 parts of the tetraol copolymer containing 0.3 parts of DMP and 0.01 part of stannous octoate were mixed and stirred enough at the room temperature. The samples were prepared in the same manner as in Example 4. The result is shown in Table 4. The total equivalent ratio NCO/OH, that is, isocyanate equivalent to the total hydroxy equivalent in both polyol used in the prepolymer and polyol in the additional component was 1.35.

Similarly, the prepolymer having NCO/OH = 2.9 was prepared. The resulting prepolymer contained 4.52 percent of NCO. 50 Parts of the prepolymer and 50 parts of the polyol (same as for preparation of the prepolymer) containing 0.3 parts of DMP and 0.01 part of stannous octoate were mixed and sufficiently stirred at the room temperature, to form the sample. The equivalent ratio NCO/OH in this sample was 1.38.

As shown in Table 4, even when the NCO/OH was above 2.0 in the preparation of the prepolymer, the appropriate hardness, high resilience and high thermal I. 100 Parts of polyoxypropylenetriol having the OH equivalent molecular weight of 930 and 18.7 parts of TDI 80 were reacted to form the prepolymer (liquid II) containing NCO of 3.81 percent. The liquids I and II were mixed at room temperature so that the NCO/OH is 1.0. The mixture was cured at 70° C. for 8 hours to form an elastomer of entire urethane type as a reference sample. The exothermic heat in the rotation at 10 cycles per second under 1 Kg/cm$^2$ of shearing stress was measured on both the elastomer with isocyanurate and the elastomer of entire urethane type produced in Example 6. The heat of the former was 84 percent of that of the latter.

EXAMPLE 7

The procedure of Example 4 was followed except using polyoxypropylenetriol with the molecular weight of 1,210, and 14.4 parts of TDI (corresponding to NCO/OH = 2.00), to form the prepolymer. To this prepolymer were added 22.3 parts of polyoxypropylenetriol containing 0.14 of DMP and mixed. The resulting mixture was introduced by pressure into tire (size LT 6.00–16) in the similar manner as in Example 1, and subjected to driving test. No special abnormality was recognized.

EXAMPLE 8

100 Parts of polyoxypropylene polyethyleneoxide tetraol copolymer containing terminatedly addition-polymerized ethyleneoxide in an amount of 10 percent, and having the OH equivalent molecular weight of 2,010 were dehydrated at 90° C. under reduced pressure of less than 4 mm Hg for three hours. After cooled to 70° C., the copolymer was mixed with 8.73 parts of TDI 80 which corresponds to an NCO/OH of 2.02, followed by reaction under nitrogen atmosphere for 5 hours. The resulting prepolymer contains NCO of 2.10 percent. 50 Parts of this prepolymer and 50 parts of polyoxypropylene polyethyleneoxide tetraol copolymer containing 0.4 parts of DMP, and terminated with ethyleneoxide in the amount of 10 percent, and having the OH equivalent molecular weight of 2520 were mixed and stirred enough at 40° C. The mixture was poured into the slab mould 2 mm thick and cured at 70° C. for 22 hours. The total equivalent ratio NCO/OH was 1.08. The hardness of this sample was 18 degree. Such material is provided for improvement of driving properties of the filled tire.

What is claimed is:

1. A process for preparing a noncellular soft polyurethane elastomer containing isocyanurate rings, which comprises mixing
   (a) polyoxypropylene polyol having an OH equivalent molecular weight of about 500–3,000 and a functionality of 2–5;
   (b) a polyisocyanate compound, the equivalent ratio (NCO/OH) of isocyanate groups in the polyisocyanate compound to hydroxyl groups in the polyol being from about 0.95–3.3; and
   (c) from about 0.01 to 2.0 parts by weight per 100 parts by weight of the sum of the polyol and polyisocyanate compounds of a tertiary amine catalyst which is N,N-dimethylbenzylamine or N,N-dimethylcyclohexylamine,
   and curing the mixture.

2. The process claimed in claim 1, wherein the polyoxypropylene polyol contains ethyleneoxide addition-polymerized.

3. The process claimed in claim 2, wherein the content of ethylene oxide in the polyol is about 5–30 percent by weight.

4. The process claimed in claim 1, wherein the OH equivalent molecular weight of the polyol ranges from about 800–2,500.

5. The process claimed in claim 4, wherein the OH equivalent molecular weight of the polyol ranges from about 800–2,000.

6. The process claimed in claim 1, wherein the functionality of the polyol ranges from 3–4.

7. The process claimed in claim 1, wherein the polyol is polyoxypropylene polyol containing ethylene oxide at the terminals thereof in the content of 5–30%, and having the OH equivalent molecular weight of about 2,000–3,000 and the functionality of 3–4.

8. The process claimed in claim 1, wherein the polyisocyanate compound is tolylenediisocyanate.

9. The process claimed in claim 1, wherein the ratio of NCO/OH is 1.0–2.0.

10. The process claimed in claim 1, wherein the tertiary amine catalyst is added in the amount of about 0.1–1.0 weight parts per 100 weight parts of the total amount of the polyol and the isocyanate compound.

11. The process claimed in claim 1, wherein the curing step is carried out by one shot method.

12. The process claimed in claim 11, wherein the tertiary amine catalyst is premixed with the polyol.

13. The process claimed in claim 1, wherein the curing step is carried out by prepolymer method.

14. The process claimed in claim 1, wherein the tertiary amine catalyst is N,N-dimethylbenzylamine.

15. The process claimed in claim 1, wherein the tertiary amine catalyst is N,N-dimethylcyclohexylamine.

16. A soft polyurethane elastomer having isocyanurate rings, produced in accordance with the process claimed in claim 1.

17. A tire filling material produced in accordance with the process claimed in claim 1.

18. A process for preparing noncellular soft polyurethane elastomer having isocyanurate rings, which comprises mixing
   (a) polyoxyropylene polyol having an OH equivalent molecular weight of about 500–3,000 and a functionally of 2–5;
   (b) a polyisocyanate compound, the equivalent ratio (NCO/OH) of isocyanate groups in the polyisocyanate compound to hydroxyl groups in the polyol being from about 0.95–3.3;
   (c) from about 0.01 to 2.0 parts by weight per 100 parts by weight of the sum of the polyol and polyisocyanate compounds of a tertiary amine catalyst which is N,N-dimethylbenzylamine or N,N-dimethylcyclohexylamine; and
   (d) less than about 0.5 weight parts of an organic tin catalyst per 100 weight parts of the total amount of polyol and polyisocyanate compound;
   and curing the mixture.

19. A process for the preparation of a noncellular tire filling material, which process comprises mixing
   (a) polyoxypropylene polyol having an OH equivalent molecular weight of about 500–3,000 and a functionality of 2–5;
   (b) a polyisocyanate compound, the equivalent ratio (NCO/OH) of isocyanate groups in the polyisocyanate compound to hydroxyl groups in the polyol being from about 0.95–2.0; and
   (c) from about 0.01 to 2.0 parts by weight per 100 parts by weight of the sum of the polyol and polyisocyanate compound of a tertiary amine catalyst which is 2,4,6-tris(dimethylaminomethyl)phenol, N,N-dimethylbenzylamine, N,N-dimethylcyclohexylamine;
   and curing the mixture.

20. A process according to claim 19 wherein the catalyst is 2,4,6-tris(dimethylaminomethyl)phenol.

21. A process according to claim 19 wherein the catalyst is N,N-dimethylbenzylamine.

22. A process according to claim 19 wherein the catalyst is N,N-dimethylcyclohexylamine.

23. A non-cellular tire filling material obtained according to the process of claim 19.

* * * * *

UNITED STATES PATENT AND TRADEMARK OFFICE
CERTIFICATE OF CORRECTION

PATENT NO. : 4,124,573
DATED : November 7, 1978
INVENTOR(S) : YOJI WATABE ET AL

It is certified that error appears in the above-identified patent and that said Letters Patent are hereby corrected as shown below:

On title page of the patent following data element [22], insert --[30] Foreign Application Priority Data
March 16, 1976   Japan   51-27742
March 27, 1976   Japan   51-33081 --

Signed and Sealed this

Twentieth Day of March 1979

[SEAL]

Attest:

RUTH C. MASON
*Attesting Officer*

DONALD W. BANNER
*Commissioner of Patents and Trademarks*